P. JONES.
DUAL TIRE WHEEL FOR AUTOTRUCKS.
APPLICATION FILED JAN. 6, 1912.
1,032,757.
Patented July 16, 1912.
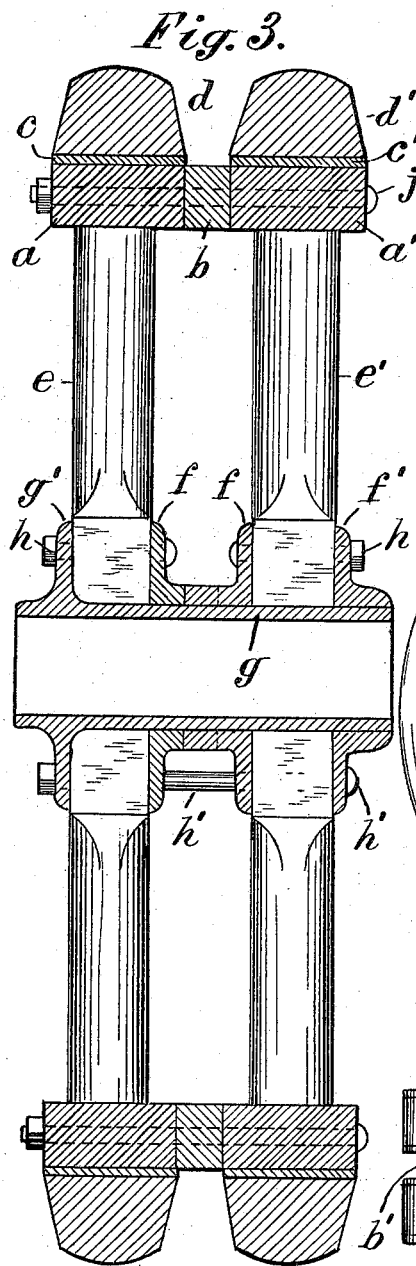
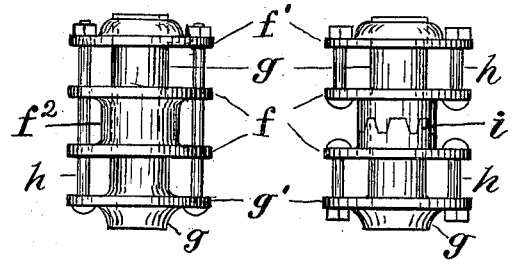
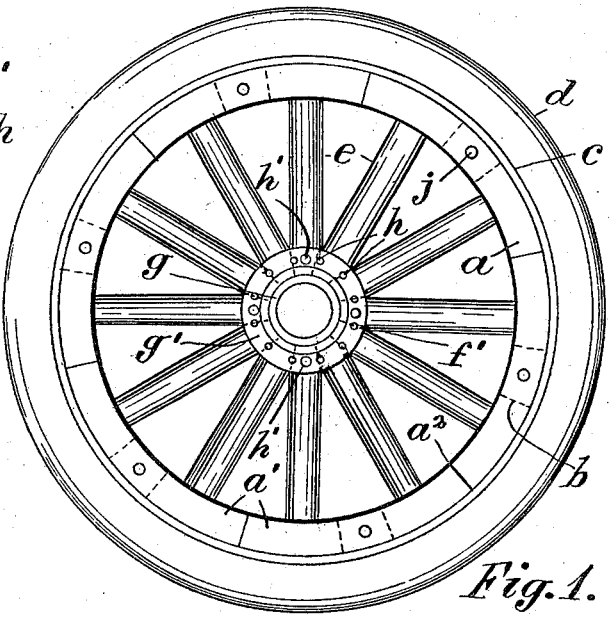

UNITED STATES PATENT OFFICE.

PHINEAS JONES, OF METUCHEN, NEW JERSEY.

DUAL-TIRE WHEEL FOR AUTOTRUCKS.

1,032,757.     Specification of Letters Patent.     Patented July 16, 1912.

Application filed January 6, 1912. Serial No. 669,753.

*To all whom it may concern:*

Be it known that I, PHINEAS JONES, a citizen of the United States, residing at Oak street, Metuchen, county of Middlesex, and State of New Jersey, have invented certain new and useful Improvements in Dual-Tire Wheels for Autotrucks, fully described and represented in the following specification and the accompanying drawings, forming a part of the same.

This invention relates to an improvement in the wooden bodies or spokes and fellies of wheels for auto trucks which, when required to carry heavy loads, are provided with dual-tires.

It is now the useage adopted by the automobile association to make the felly of a single-tire wheel three-quarters of an inch less in width than the nominal width of a single tire, but in making a dual-wheel the adopted usage is to make the felly twice the width of the tire, thus requiring the dual-wheel fellies to be one and a half inches wider than two of the fellies for a single wheel. Heretofore, the wide fellies to support dual-tires have often been provided with a single set of spokes at the middle of their width with the fellies overhanging very considerably at both sides of such spokes. The wood required to make fellies ten or twelve inches wide is difficult to obtain and also expensive, whereas the wood required for making fellies four and a quarter or five inches wide can be purchased and worked much more cheaply.

In the present invention, I form the dual-tire wheel of two similar single-tire wheels having their hubs mounted upon a sleeve with intermediate spacing flanges, and secured rigidly thereon, and the fellies of the two wheels secured together by through-bolts. I thus avoid the use of wide timber in making the fellies of the dual-tire wheel. In making a wheel with rim ten inches broad to receive two tires four and a quarter inches wide each, I thus employ two single wheels each having a set of spokes with fellies and bands four and a quarter inches wide each, and bolted firmly together with intermediate blocks or thimbles one and a half inches thick.

The drawing illustrates a wheel with ten inch rim, Figure 1 being an elevation of the wheel; Fig. 2 is a plan of the same; Fig. 3 is a section of the same, and Fig. 4 a plan of the hub with interlocked flanges between the two sets of spokes; Fig. 5 shows the hub with a spool between the sets of spokes. Fig. 3 is drawn upon a larger scale than the other figures.

The ten inch rim upon the wheel is made of two fellies $a$, $a'$, each four and a quarter inches wide, and intermediate packing-blocks $b$ one and a half inches wide. Bolts $b'$ are extended through the fellies and the blocks, clamping the whole rigidly together. The metal bands $c$, $c'$, which are shrunk upon the fellies, are also four and a quarter inches wide, and the rubber-tires or threads $d$, $d'$ are fitted to such bands. It is immaterial how the tires are attached to the bands. Two sets of wooden spokes $e$, $e'$ carry wooden fellies $a$, $a'$, and are clamped with intermediate flanges upon a sleeve $g$ which is made of suitable bore to fit an axle and turn thereon or be driven thereby, as may be required.

It will be noticed in Fig. 3 that the spokes are not dished but perpendicular to the axis of the wheel and shaped (see Fig. 1) to form a solid mass of wood between the clamping flanges, so as to be bored with a cylindrical hole. Such spokes necessarily require spacing-flanges $f$ between them, the same as spacing-blocks are required between the fellies $a$, $a'$.

One of the flanges or collars $g'$ is made integral with the sleeve, and one set of spokes is clamped against the flange $g'$ by a flange $f$ and bolts $h$. The other set of spokes is clamped between inner and outer flanges $f$, $f'$ by bolts $h$, and through-bolts $h'$ embrace all of the flanges to clamp all of the parts rigidly to the integral flange $g'$. The flanges $f$ form the spacing element of the hub, and are connected together by teeth $i$, as shown in Fig. 4, or by forming them integral with the body of a spool, as shown in Fig. 5. Where the teeth $i$ are employed, the through-bolts $h$ serve to hold them in rigid engagement.

In the construction of automobiles various parts are made by different manufacturers, and it is common for the maker of the automobile to furnish the sleeve for the truck-wheels and obtain from a wheel-maker the wooden portions of the wheel including the spokes, fellies and bands shrunk thereon. My invention thus permits the automobile-maker to employ a straight sleeve with a bore to fit the shaft or journal of the automobile and with a flange to which the wooden parts of the wheel can be securely bolted, and to employ mere duplicates of the parts employed in constructing single-tire wheels. The construction greatly facilitates the manufacture of dual-tire wheels, as it enables the stock for single-tire wheels to be used, without change, in fitting up dual-tire wheels.

Fig. 3 shows the very small amount that the fellies overhang the spokes with my construction, in which two sets of spokes are used, each set standing directly under the middle of one of the tires.

The drawing shows that the fellies, the spokes, and the angle-collars $f'$ are the same as are used in constructing a single-tire wheel, and that only the flanges $f$ connected together would differ in the dual-tire construction. The dual-tire wheel is thus made of two similar wheel-bodies, with their hubs interlocked and mounted upon the same sleeve, and their rims secured rigidly together by through-bolts.

The fellies are shown in Fig. 1 with the usual joints $a^2$ between the sections of each felly.

Having thus set forth the nature of the invention what is claimed herein is:

1. A dual-tire wheel comprising two wooden fellies with interposed spacing-blocks and connected by clamping-bolts, two sets of spokes fitted perpendicularly within the two fellies and tapered at their inner ends to form a solid mass of wood bored the same for both sets, spacing-flanges fitted between the sets of spokes at their bore, flanges fitted outside of the spokes, and bolts extended through the four flanges to clamp them together.

2. A dual-tire wheel comprising two wooden fellies with interposed spacing-blocks and connected by clamping-bolts, two sets of spokes fitted perpendicularly within the two fellies and tapered at their inner ends to form a solid mass of wood bored the same for both sets, flanges at opposite sides of each set of spokes with bolts $h$ to clamp them thereon and the intermediate flanges having interlocking teeth $i$ to engage the two sets of spokes positively together.

In testimony whereof I have hereunto set my hand in the presence of two subscribing witnesses.

PHINEAS JONES.

Witnesses:
 L. LEE,
 THOMAS S. CRANE.

Copies of this patent may be obtained for five cents each, by addressing the "Commissioner of Patents, Washington, D. C."